July 11, 1939.   D. R. BERLIN   2,165,443
AIRCRAFT POWER PLANT
Filed April 16, 1937   4 Sheets-Sheet 1
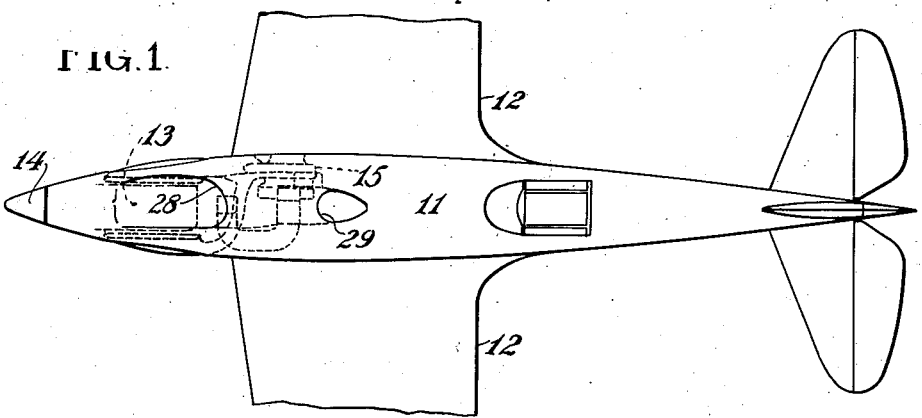
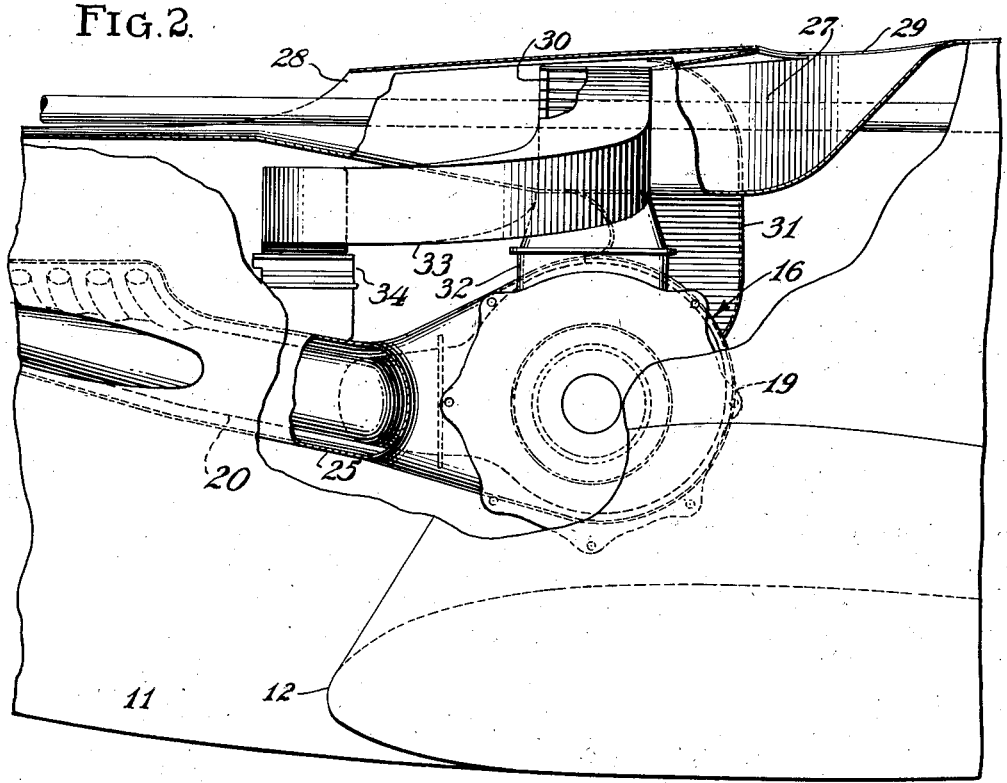
INVENTOR
DONOVAN R. BERLIN.
BY
ATTORNEY July 11, 1939.  D. R. BERLIN  2,165,443
AIRCRAFT POWER PLANT
Filed April 16, 1937   4 Sheets-Sheet 2

INVENTOR
DONOVAN R. BERLIN.
BY
ATTORNEY

July 11, 1939.   D. R. BERLIN   2,165,443
AIRCRAFT POWER PLANT
Filed April 16, 1937    4 Sheets-Sheet 3

INVENTOR
DONOVAN R. BERLIN.
BY
ATTORNEY

July 11, 1939.  D. R. BERLIN  2,165,443
AIRCRAFT POWER PLANT
Filed April 16, 1937  4 Sheets-Sheet 4

INVENTOR
DONOVAN R. BERLIN.
BY
ATTORNEY

Patented July 11, 1939

2,165,443

UNITED STATES PATENT OFFICE 2,165,443

AIRCRAFT POWER PLANT

Donovan R. Berlin, Eggertsville, N. Y., assignor to Curtiss-Wright Corporation, a corporation of Delaware Application April 16, 1937, Serial No. 137,194

4 Claims. (Cl. 60—13)

This invention relates to aircraft power plant installations, being particularly concerned with an improved arrangement of an engine and a turbo supercharger organization within an aircraft body.

In certain power plant installations, an engine is cowled within an aircraft body and the power output of the engine is augmented by the use of a turbo supercharger consisting of an exhaust gas driven turbine directly connected to a supercharger which serves to boost the pressure of air entering the engine intake above that of the surrounding atmosphere. The supercharged air is heated by the pressure boost and, for greatest thermal efficiency, requires intercooling, necessitating the use of a radiator which must be coordinated with other units of the power plant. Some of these turbo supercharger installations comprise the installation of the unit on the side of the aircraft body, projecting somewhat therefrom to the detriment of the smooth streamlining of the body. Since the supercharger unit per se, the inter-cooler and, in the case of a liquid cooled engine, the cooling radiator, are all relatively bulky pieces of apparatus, quite a problem is presented in so arranging the apparatus as to provide a clean body exterior along with an efficient and convenient arrangement of the units.

It is an object of this invention to provide a novel form of aircraft power plant arrangement.

A further object is to locate a turbo supercharger and associated apparatus behind an aircraft engine and within the confines of the aircraft body.

Still another object is to provide suitable inlets and outlets for cooling air and for exhaust gases which will not interfere with the smooth form of the fuselage, and yet which will provide for adequate air flow or gas flow.

In the specific form of the invention chosen for illustration, I indicate the use of a liquid cooled aircraft engine in conjunction with the several accessories, but it is not intended that the invention should be limited to the use of such an engine type, since it is within the capacity of those skilled in the art to utilize the principles of the invention in connection with other types of engines.

Further objects will be apparent from a reading of the subjoined specification and claims, in conjunction with an examination of the accompanying drawings, in which similar numbers indicate similar parts, and in which:

Fig. 1 is a plan of an aircraft showing the power plant installation diagrammatically;

Fig. 2 is an enlarged fragmentary side elevation showing the turbo supercharger installation;

Referring first to Figs. 1 to 5, inclusive, I show a conventional fuselage 11 provided with wings 12 extending laterally therefrom, the fuselage being provided at its forward end with a liquid cooled internal combustion engine 13, completely housed within the fuselage 11.

Figure 3:
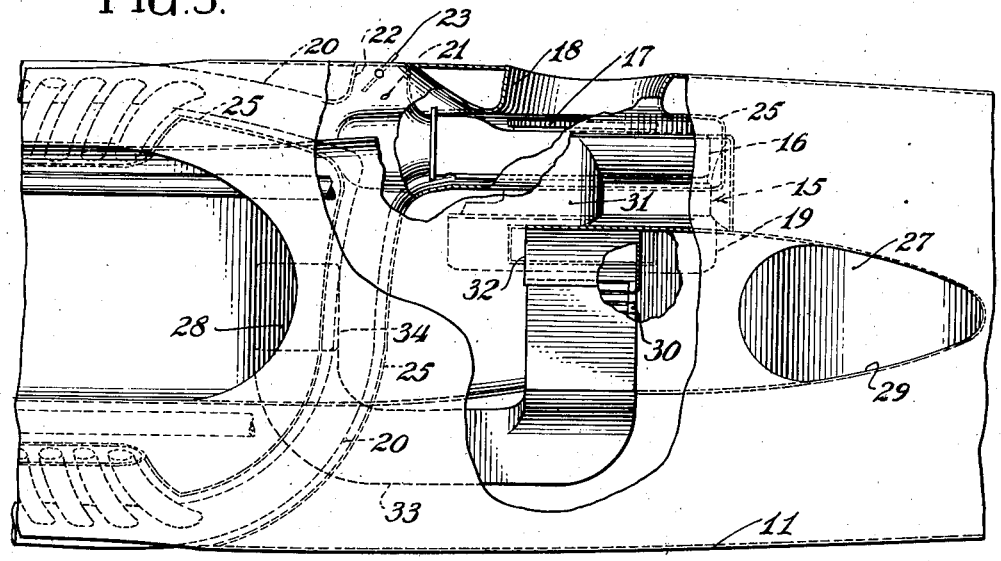
Fig. 3 is an enlarged fragmentary plan showing the turbo supercharger installation.
Figure 4:
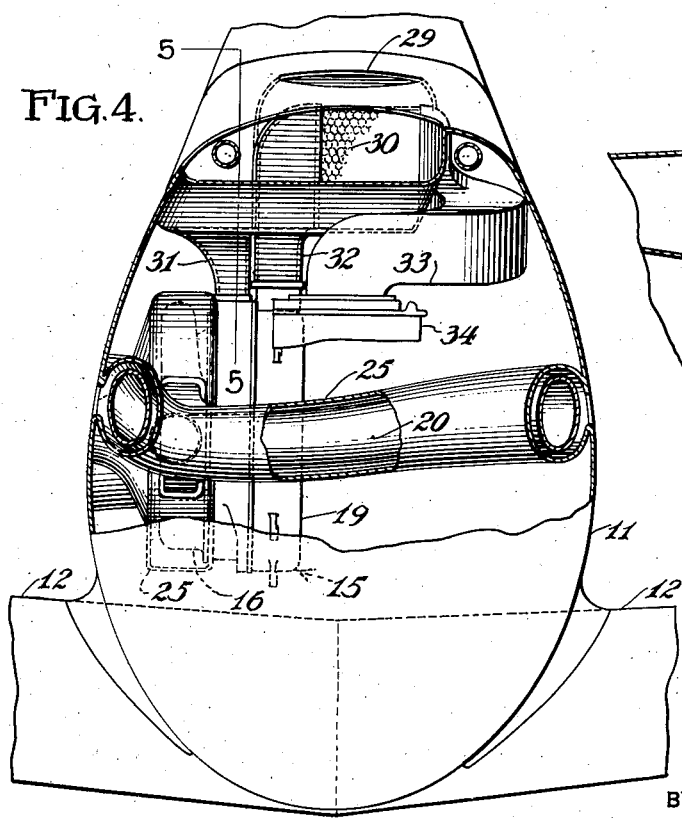
Fig. 4 is a section through the fuselage just forward of the turbo supercharger installation.
Figure 5:
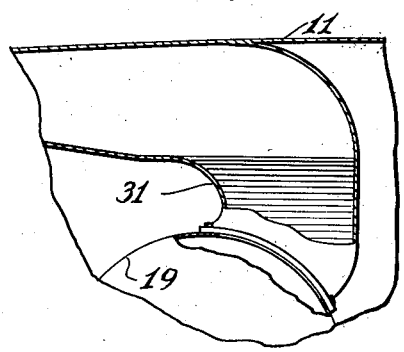
Fig. 5 is a section on the line 5—5 of Fig. 4.
Figure 6:
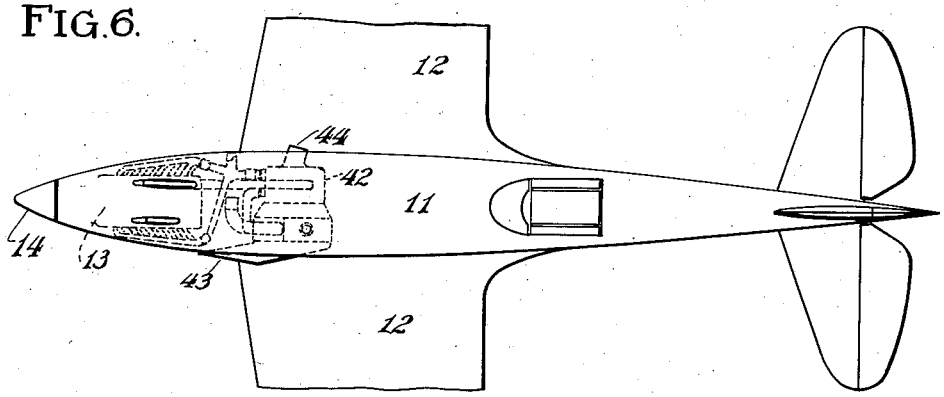
Fig. 6 is a plan of an aircraft showing, diagrammatically, an alternative arrangement.
Figure 7:
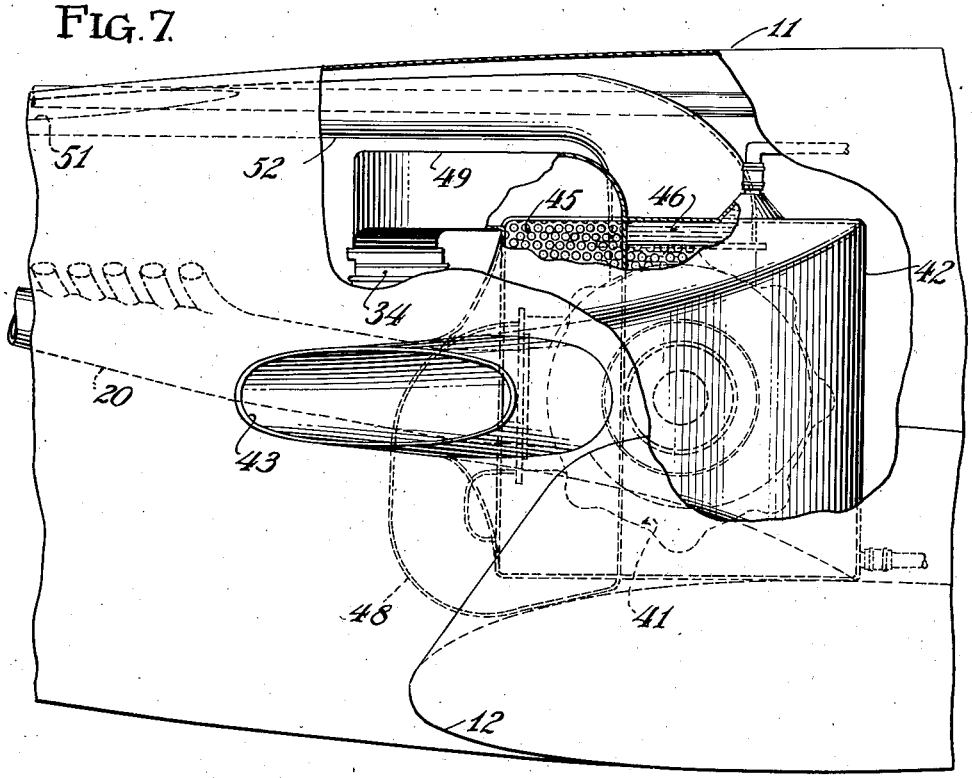
Fig. 7 is an enlarged fragmentary elevation of the alternative embodiment.
Figure 8:
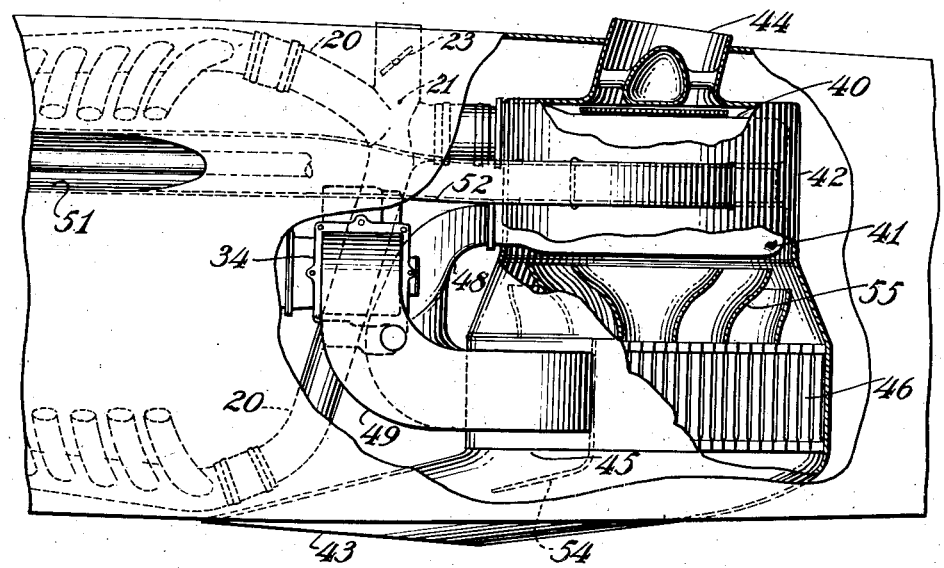
Fig. 8 is an enlarged fragmentary plan of the alternative embodiment.
Figure 9:
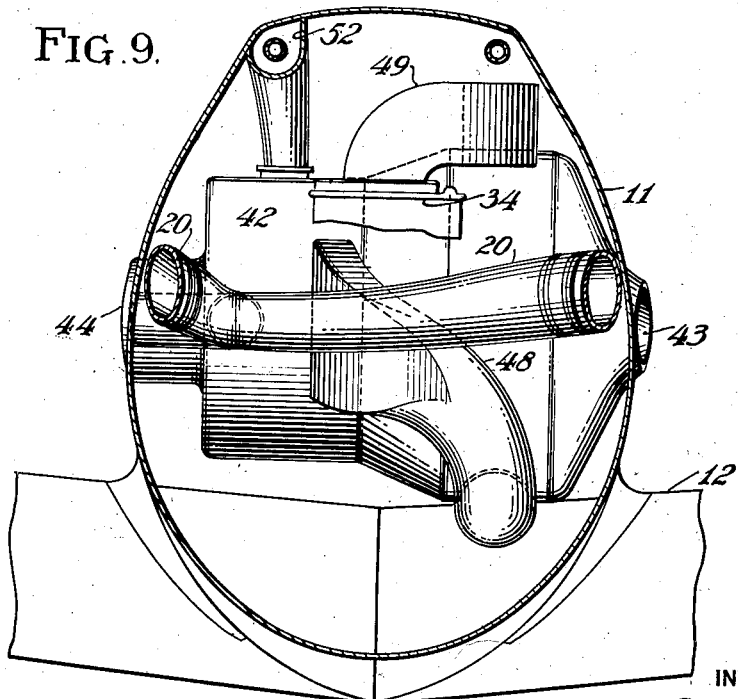
Fig. 9 is a section through the aircraft fuselage just forward of the turbo supercharger installation of the alternative embodiment.

The engine 13 is provided with a forwardly mounted propeller 14 in the conventional manner. The power plant space extends rearwardly of the engine 13 within the fuselage to accommodate a turbo supercharger unit 15 which comprises, as shown in Figs. 3 and 4, a nozzle box 16 having a turbine wheel 17 inboard of the fuselage adapted to discharge through a short laterally extending opening 18. As shown in the drawings, the rotational axis for the turbine wheel 17 is substantially horizontal and extends transversely of the fuselage. The turbine wheel 17 drives a supercharger impeller contained within a supercharger housing 19 forming part of the unit 15. Exhaust gases are conducted by the manifolds 20 to a cross connection 21 connected to the nozzle box 16, a leg 22 of the cross opening directly to the atmosphere and being provided with a waste gate 23. The waste gate serves as a by-pass for exhaust gases coming from the engine to serve as a control for the turbo supercharger.

It is apparent that the exhaust pipes 20 will tend to run very hot during operation and accordingly, these are enclosed in a casing 25, which also embraces the nozzle box 16, to eliminate any fire hazard which might arise from the heated parts.

A longitudinal well 27 is formed in the top of the fuselage to provide an air entrance opening 28, facing forwardly, and an air exit opening 29, facing rearwardly. Within this well is disposed an intercooler 30, comprising a more or less conventional tube type radiator, through the tubes of which cooling air passing through the well is adapted to flow. From the well, a conduit 31 leads to the air intake of the supercharger 19, whence air is compressed by the supercharger and delivered through a conduit 32 to the inter-tube spaces of the intercooler 30. From the latter, a conduit 33 leads to an air intake 34 of the engine 13.

In this embodiment no provision is made for a radiator for engine cooling, which latter may be disposed in some other location according to conventional practice. It will be noted that cooling air flow through the intercooler is from front to rear, while the supercharged air delivered by the unit 16 flows transversely through the intercooler and through the ducts 32 and 33. Cooling air and the air intake for the supercharger is taken from the well 27, and it will be seen that the several units necessary for the supercharger installation are all housed within the aircraft body, avoiding the drag which would be occasioned if these units were disposed without the body, in the air stream. The air intake opening 28 for the well 27 is disposed at a region on the fuselage where positive air pressure exists, whereby air of high density may be utilized.

Referring now to Figs. 6 to 9, inclusive, an alternative arrangement of a turbo supercharger installation is shown. The fuselage 11, wings 12, engine 13 and propeller 14 are shown, as previously, the exhaust manifolds 20 leading rearwardly of the engine to the cross 21, whence the waste gate 23 permits of by-passing of the exhaust gas, and when said cross leads to a nozzle box 40 of a turbo supercharger unit 41. Said unit is wholly contained within a casing 42 terminating at an air entrance opening 43 on the left side of the fuselage, as shown, the casing having clearance around the turbo supercharger unit 41, so that air passing through the casing passes around the turbo supercharger, to exhaust, with the exhaust gases from the turbine, through an air exit 44 on the right hand side of the aircraft body. Within the casing 41, to windward of the turbo supercharger, are disposed tubular type radiators 45 and 46, the tubes of the radiators being transverse to the fuselage axis so that a cross flow of cooling air from the air intake 43 passes through the radiators before it passes around the turbo supercharger. The radiator 45 serves as an intercooler in the same way as described in connection with the first embodiment. Pressure air delivered by the supercharger of the unit 41 passes to the intercooler radiator 45 through a duct 48, and from the radiator 45 a duct 49 carries the cooled supercharged air to the air intake 34 of the engine. The radiator 46 is connected in a conventional manner, not shown, to the cooling system of the engine 13.

That air which is compressed by the supercharger is conducted from a channel 51 in the top of the fuselage through a duct 52 to the air intake side of the engine. If necessary, baffles 54 and 55 may be fixed within the casing 41 to distribute air flow therethrough to direct sufficient amounts of cooling air to the respective radiators 45 and 46, and to direct air which has passed through the radiators toward the periphery of the turbo supercharger unit 41, so that it may flow therearound to the exit opening 44. In this arrangement it will be noted that the turbo supercharger and radiator system comprise a single unit confined within the casing 42, which unit may be installed or removed without disturbing associated parts of the engine installation. The unit, by virtue of the form of the casing 42, carries its own air entrance and air exit openings adapted for coordination with the outlines of the airplane fuselage.

In both of the embodiments shown, the supercharger and intercooler apparatus are confined wholly within the outlines of the fuselage and are readily available for inspection and servicing without their being demounted from the aircraft, and without interfering with independent inspection of the engine per se.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In aircraft, in combination, a body having an internal combustion power plant within its forward end, a radiator within the body rearward of the power plant, a turbo supercharger within the body having its turbine discharging laterally from the body and having the discharge end of its supercharger feeding said radiator, ducts leading through the body surface for establishing cooling airflow to said radiator, and ducts directing the cooling airflow leaving said radiator over and around the surface of said turbine, and through the body surface.

2. In an aircraft body, in combination, a fluid cooled internal combustion engine, a turbo supercharger behind said engine and organized so that the turbine thereof exhausts from one side of the body, said body having an air entrance opening on the opposite side thereof, radiators disposed rearward of said engine, within said body and arranged to receive cooling airflow from said opening, one said radiator being connected to the engine cooling system, the other said radiator serving as an intercooler, and connections leading from said supercharger to said intercooling radiator and thence to the engine air intake, said radiators and supercharger being in substantial alinement across said body, and means directing cooling air flow from said radiators over and around said supercharger, said air being exhausted with the turbine exhaust.

3. In an aircraft body, in combination, a fluid cooled internal combustion engine, a turbo supercharger behind said engine and organized so that the turbine thereof exhausts from one side of the body, said body having an air entrance opening on the opposite side thereof, radiators disposed rearward of said engine, within said body and arranged to receive cooling airflow from said opening, one said radiator being connected to the engine cooling system, the other said radiator serving as an intercooler, connections leading from said supercharger to said intercooling radiator and thence to the engine air intake, and a casing embracing said turbo supercharger and radiators, through which cooling air leaving said radiators is adapted to flow, said casing having an opening adjacent the turbine exhaust to establish mingling of exhaust gases and said cooling air, and being transversely disposed within the body between said opening and the turbine exhaust.

4. In an aircraft body, in combination, a fluid cooled internal combustion engine, radiators disposed side by side within said body rearward of said engine for transverse air flow, one said radiator being connected to the engine for cooling same, the other said radiator comprising an intercooler, an air entrance opening in said body directing cooling air through said radiators, a turbo supercharger adjacent said radiators, the supercharger of said turbo supercharger being connected to the engine air intake through said intercooler, said body having a side opening through which the turbine discharges, and means for directing air leaving said radiators over and around said turbine, and through said turbine discharge side opening, and means directing cooling air flow from said radiators over and around said supercharger, said air being exhausted with the turbine exhaust.

DONOVAN R. BERLIN.